(12) United States Patent
Kim

(10) Patent No.: US 6,250,325 B1
(45) Date of Patent: Jun. 26, 2001

(54) ROLL OVER VALVE FOR VEHICLES

(75) Inventor: Jong-In Kim, Shiheung (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/420,048

(22) Filed: Oct. 18, 1999

(30) Foreign Application Priority Data

Dec. 30, 1998 (KR) .................................................. 98-62278

(51) Int. Cl.⁷ .................................................. F16K 17/36
(52) U.S. Cl. .................................. 137/39; 137/38; 137/43
(58) Field of Search ................................ 137/39, 43, 38

(56) References Cited

U.S. PATENT DOCUMENTS

| | | | |
|---|---|---|---|
| 4,095,609 | * | 6/1978 | Martin ...................................... 137/43 |
| 4,742,840 | * | 5/1988 | Takahashi et al. ....................... 137/43 |
| 4,756,328 | * | 7/1988 | Sherwood ................................ 137/43 |

* cited by examiner

Primary Examiner—John Rivell
Assistant Examiner—Ramesh Krishnamurthy
(74) Attorney, Agent, or Firm—Christie, Parker & Hale, LLP

(57) ABSTRACT

A roll over valve adapted for use in an evaporative gas control device for vehicles to simplify the structure thereof and to enable an accurate fuel fill-up, the roll over valve comprising: a hollow housing fixed at an upper end of a fuel tank and formed with a service pipe in order to cut off fuel gas; an outlet pipe fixedly disposed on the housing for connection to the housing and for connection again to a canister; a ball case for being liftably mounted in the housing for fuel and gas to pass therethrough and for being disposed with the outlet pipe arranged therethrough; a circular moving part for being formed at a bottom surface of the ball case to hold a ball therein; a sealing pad disposed on the moving part to shield the outlet pipe when the ball case is lifted; and a tensile spring provided between the ball case and the housing to apply an upward resilience to the ball case.

3 Claims, 4 Drawing Sheets

ROLL OVER VALVE FOR VEHICLES

BACKGROUND OF THE INVENTION

1. Field of the Invention

The present invention relates to a roll over valve for vehicles adapted for use in an evaporative gas control apparatus for vehicles.

2. Description of the Invention

Generally, a vehicle fuel supply apparatus is so constructed as to supply an appropriate quantity of fuel from a fuel tank, and the apparatus is provided with an evaporative gas control device for reuse of evaporative gas generated from the fuel tank.

The evaporative gas control device includes, as illustrated in FIG. 4, a fuel tank 51 having an inherent fuel pump 50, a roll over valve 53 disposed on the fuel tank 51 and connected to a canister 52, and a fuzzy control valve 54 arranged between the canister 52 and a suction manifold (M).

In other words, when evaporative gas is formed in the fuel tank 51 to reach a predetermined pressure and beyond, the roll over valve 53 is made to open to allow the gas to be infused into the canister 52, and the gas passes the charcoal granules thereat, where gasoline is collected and only air is discharged into the atmosphere. The gasoline collected in the canister 52 is infused into the suction manifold (M) to thereafter be re-burnt when the fuzzy control valve 54 is opened by negative pressure of the suction manifold (M). At this time, the roll over valve 53 serves to control the evaporative gas and prevent leakage of fuel and gas when a vehicle is tilted and over-turned.

The roll over valve 53 includes, as illustrated in FIG. 5, a housing 57 disposed on the fuel tank 51 and formed with a connector 56 for forming a hole 55 thereunder and for connecting the canister 52 thereon, a float 58 inserted into an inner bottom surface of the housing 57, a stopper 59 fixed to be positioned at an upper area of the float 58, a valve body 61 fixed by disposed on the housing 57 and formed with a plurality of through holes 60, a lifting member 63 liftably disposed in the stopper 59 and supported by a spring 62 for interdicting the valve body 61 when ascended by the float 58 and for opening the valve body 61 when descended by the float 58, a ball 64 provided on the valve body 61, and a rod 65 with one end of which contacting the ball 64 and the other end of which being supported by the lifting member 63 to thereby lift the ball 64.

Now, operation of the roll over valve will be described. When an inner pressure of the fuel tank 51 is low or when fuel level is low, the float 58 is positioned at the bottom surface of the housing 57 and the ball 64 descends the rod 65 to cause the lifting member 63 to detach from the valve body 61.

Of course, the lifting member 63 goes down because the weight of the ball 64 is greater than resilience of the spring 62. When the valve body 61 and the lifting member 63 are detached, gas is smoothly allowed to pass the through holes 60 at the valve body 63 and thereafter collected in the canister 52.

Under this circumstance, when the fuel level is raised because fuel is filled up or a vehicle is overturned, the float 58 is raised along the surface of the fuel to thereby cause an upper surface of the float 58 to ascend the lifting member 63. When the lifting member 63 is raised, the rod 65 passes the valve body 61 and rises up to push out the ball 64. In other words, the ball 64 is pushed out to cause the upper surface of the lifting member 63 to interdict the valve body 61, such that fuel or gas is prevented from being leaked out or into the canister 52.

SUMMARY OF THE INVENTION

However, there is ah problem in that, when gas or fuel is prevented from leaking by activating a float suddenly rising along the surface of the fuel, the fuel is abruptly infused into the fuel tank during filling-up of the fuel to thereby cause the float to interdict the valve body due to undulation at the surface of the fuel in a state where the fuel is not accurately poured in, such that it is very difficult to infuse the fuel accurately.

Furthermore, there is another problem in that the roll over valve is very complicated in its construction to thereby make it difficult to manufacture, and there are so many moving parts such as float, lift member, spring, rod, ball and the like to thereby incur lots of operational deficiency.

The present invention is disclosed to solve the aforementioned problems and it is an object of the present invention to provide a roll over valve for vehicles constructed to simplify the structure thereof and to enable an accurate fuel fill-up.

In accordance with the object of the present invention, there is provided a roll over valve for vehicles, the roll over valve comprising:

a hollow housing fixed at an upper end of a fuel tank and formed with a service pipe in order to cut off fuel gas;

an outlet pipe fixedly disposed on the housing for connection to the housing and for connection again to a canister;

a ball case for being liftably mounted in the housing and for fuel and gas to pass therethrough and for being disposed with the outlet pipe arranged therethrough;

a circular moving part for being formed at a bottom surface of the ball case to hold a ball therein;

a sealing pad disposed on the moving part to shield the outlet pipe when the ball case is lifted; and a tensile spring provided between the ball case and the housing to apply an upward resilience to the ball case.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Figure 1:
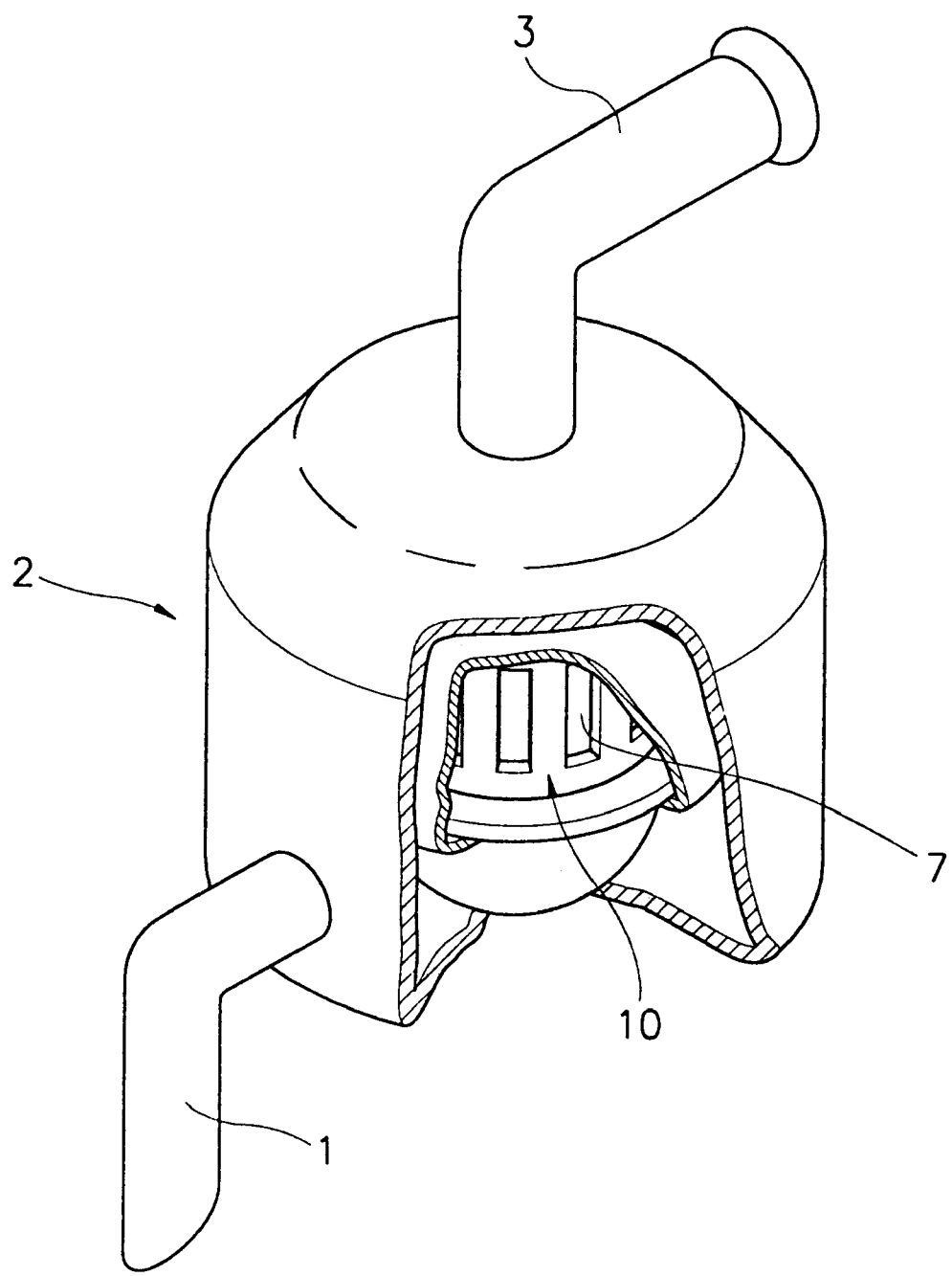
FIG. 1 is a partially cutaway perspective view for illustrating a roll over valve for vehicles according to the present invention.
Figure 2:
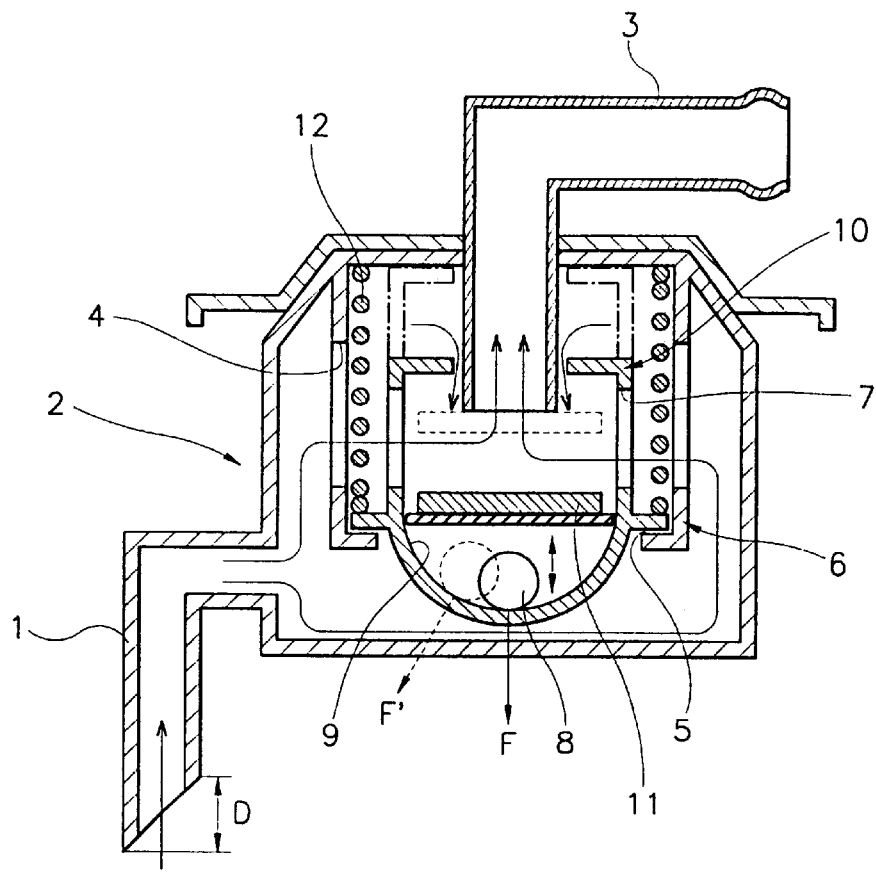
FIG. 2 is a sectional view of FIG. 1.
Figure 3:
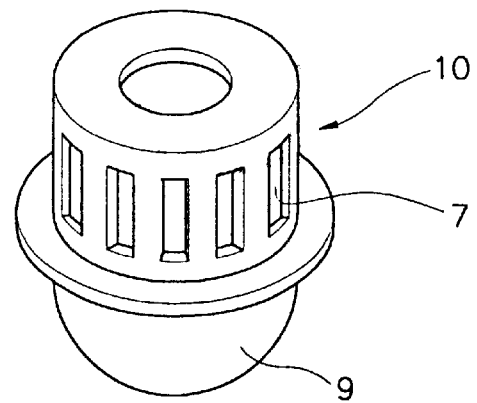
FIG. 3 is a perspective view for illustrating a ball case in FIG. 2.
Figure 4:
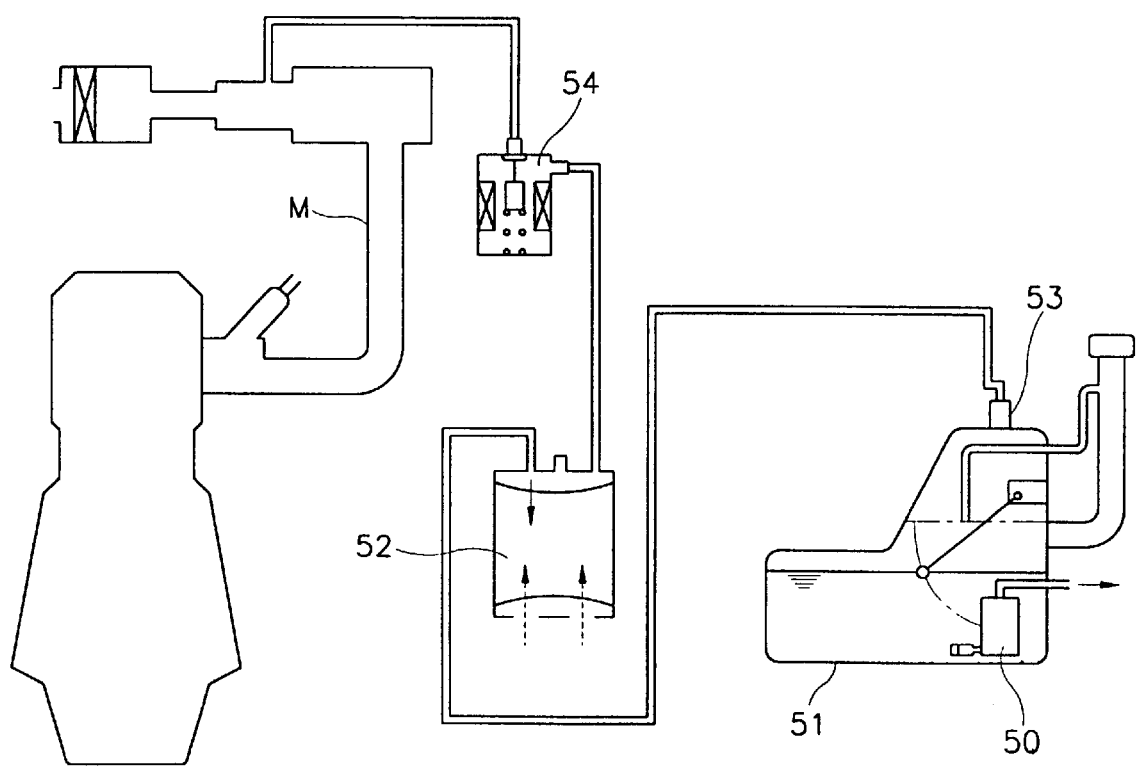
FIG. 4 is a schematic diagram for illustrating an evaporative gas control apparatus according to the prior art.
Figure 5:
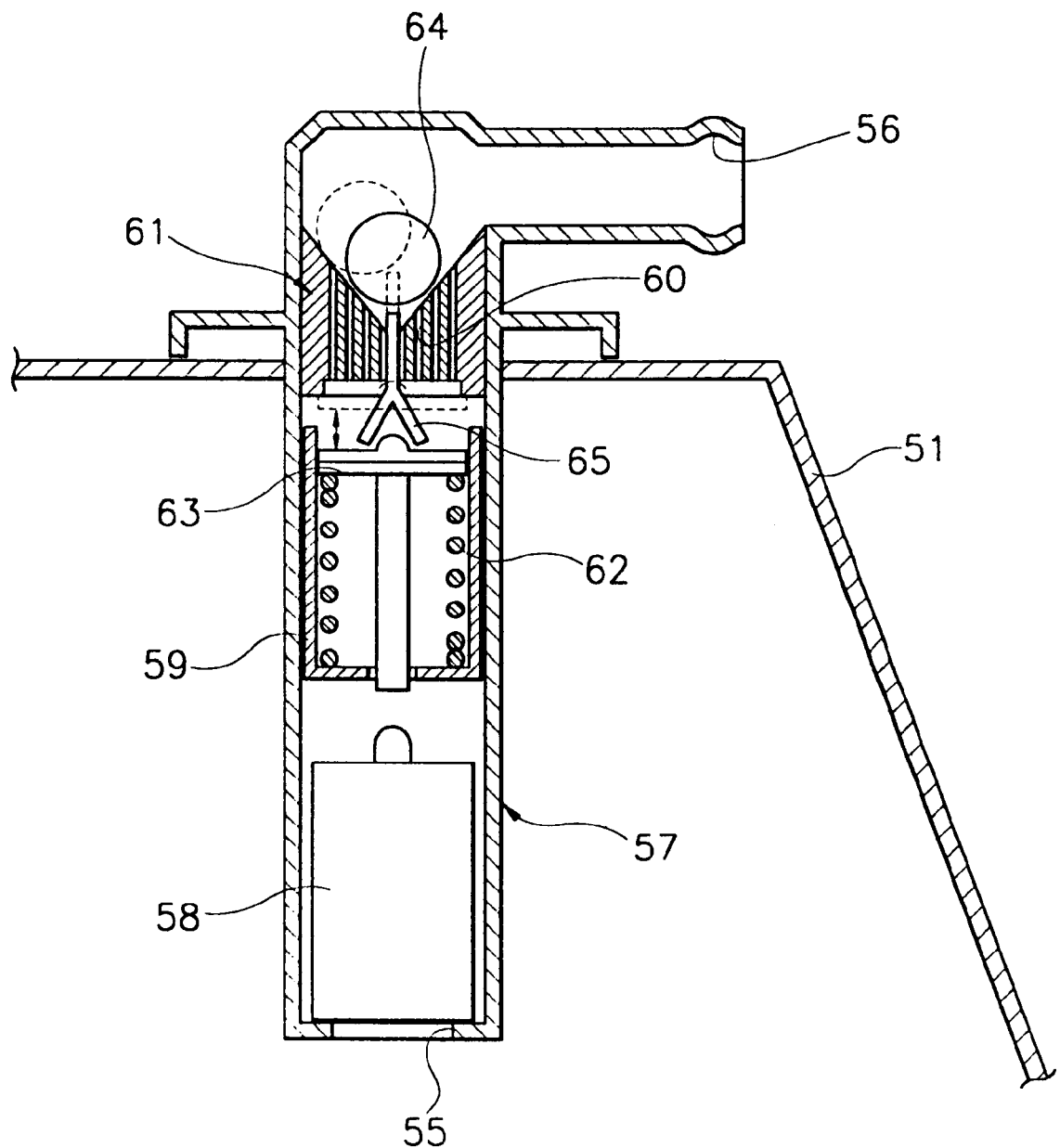
FIG. 5 is a sectional view for illustrating a roll over valve in FIG. 4.

FIGS. 1, 2 and 3 are respectively a partially cutaway perspective view and a sectional view of a roll over valve for vehicles and a perspective view of a ball case according to the present invention, where the roll over valve according to the present invention includes a housing 2 fixed to an upper end of a fuel tank 51 and formed with a service pipe 1 for infused of fuel gas, an outlet pipe 3 fixed to an upper end of the housing 2 to connect to a canister 52, a guide 6 formed at a predetermined length in the housing 2 and formed with a first connecting hole 4 and again formed with a hitching jaw 5 at a longitudinal end, a ball case 10 liftably inserted in the guide 6 and formed with a second connecting hole 7 to allow the outlet pipe 3 to pass therethrough and disposed with a ball 8 on the bottom surface to allow a semi-circular moving part 9 to movably form therein, a sealing pad 11 disposed on the moving part 9 to block the outlet pipe 3 when the ball case 10 is moved upwards, and a tensile spring 12 arranged between the ball case 10 and the guide 6 to support the ball case 10.

Particularly, a longitudinal end of the service pipe 1 in slantly cut at 45 degrees such that the service pipe 1 is not instantly blocked when the fuel is waved.

Now, operational effect of the roll over valve for vehicles thus constructed will be described.

Weight of the ball 8 and the ball case 10 serve to cope with the resilience of the tensile spring 12 when a vehicle is over-turned or tilted, where, the ball case 10 remains facing downwards in the housing 2. Under these circumstances, when the fuel surface in the fuel tank 51 is relatively low, the gas evaporated from the fuel passes the first and second connecting holes 4 and 7 via the service pipe 1, and is collecting holes 4 and 7 via the service pipe 1, and is collected at the canister 52 through the outlet pipe 3 arranged through the ball case 10.

At this location, when fuel is infused into the fuel tank 51, gas in the fuel tank 51 is discharged through the service pipe 1 and the outlet pipe 3 to allow a smooth infuse of the fuel, and when the fuel is almost filled up, fuel surface in the fuel tank 51 approaches a vicinity of the service pipe 1.

When the fuel surface reaches the vicinity of the service pipe 1 and passes the height of the service pipe 1, the service pipe 1 is blocked to prevent the gas from discharging therethrough. At this time, the fuel surface is wavered violently. When the fuel is wavered, the fuel can contact the service pipe 1 even though the fuel tank 51 is not fully filled up, and even though the wavering fuel and the service pipe 1 are contacted, the service pipe 1 is not blocked due to the fuel because the service pipe 1 is slantly formed at its longitudinal end.

In other words, the service pipe 1 is not blocked by rolling or wavering of the fuel and is only blocked when the fuel is accurately filled up, thereby preventing the difficulty by accurate fuel infuse as is experienced in the prior art, where there was a difficulty in accurate fuel supply when the fuel surface ripples.

In particular, the slanted part at the service pipe 1 allows the fuel to waver up to D which is the height of the slant part, such that an accurate fuel infuse is possible even though the fuel surface is rolled during the fuel filling up.

Furthermore, when a vehicle is overturned or severely tilted, the fuel tank 51 is tipped over to tilt the housing 2 fixed to the fuel tank 51, thereby inclining the ball case 10 too. When the ball case 10 is tilted, the ball 8 accommodated at the moving part 9 is moved, by way of example, to the left side as shown in a dotted line.

When the ball 8 is moved to the left, a force F according to gravity in a normal state is applied to a perpendicular direction to become a force F', where the force F' is applied to a direction different from that of the central axis of the tensile spring 12, such that a force pulling the tensile spring 12 in comparison to the force F is weakened, by which resilience of the tensile spring 12 moves the ball case 10 upwards. When the ball case 10 is lifted, the sealing pad 11 blocks the outlet pipe 3, thereby preventing the fuel and gas from leaking.

At this time, because the roll over valve has only the ball case 10 as an operational part, operational credibility of the roll over valve is improved as compared with the prior art.

As apparent from the foregoing, there is an advantage in the roll over valve for vehicles according to the present invention in that incoming and outgoing of gas are blocked fuel to allow a more accurate control of fuel infuse and to prevent the fuel and gas from leaking during a roll over accident with a simpler construction as well.

What is claimed is:

1. A roll over valve for vehicles, the roll over valve comprising:

a hollow housing fixed at an upper end of a fuel tank and formed with a service pipe in order to cut off fuel gas;

an outlet pipe fixedly disposed on the housing for connection to the housing and for connection to a cannister;

a ball case for being liftably mounted in the housing and disposed with a sealing pad for blocking one side of the outlet pipe when lifted and formed to allow fuel gas to pass therethrough when descended; and a biasing spring for biasing the sealing Dad upwardly against the outlet pipe, the biasing spring being disposed in the housing and abutting the ball case;

a ball disposed in the ball case, wherein the weight of the ball overcomes the force of the biasing spring causing the sealing pad to be normally detached from the outlet pipe; and wherein during a vehicle rollover the ball moves such that the weight of the ball is sufficiently relieved from the biasing spring allowing the biasing spring to bias the sealing pad against the outlet pipe to seal the outlet pipe.

2. A roll over valve for vehicles, the valve comprising:

a hollow housing fixed at an upper end of a fuel tank and formed with a service pipe in order to cut off fuel gas;

an outlet pipe fixedly disposed on the housing for connection to the housing and for connection to a cannister;

a ball case for being liftably mounted in the housing, the case including a sealing Pad for blocking one side of the outlet pipe when the case is lifted and formed to allow fuel gas to pass therethrough when descended, the ball case further including a curved moving part;

a spring disposed between the ball case and the housing wherein the spring biases the sealing pad against the outlet pipe;

a ball disposed in the curved moving part of the ball case, wherein the weight of the ball overcomes the force of the spring causing the sealing pad to be normally detached from the outlet pipe; and wherein during a vehicle rollover the ball moves within the curved moving part such that the weight of the ball is sufficiently relieved from the biasing spring to allow the biasing spring to bias the sealing pad to block said one side of the outlet pipe.

3. A roll over valve for vehicles the valve comprising:

a hollow housing fixed at an upper end of a fuel tank and formed with a service pipe in order to cut off fuel gas, wherein an end of the service pipe is cut at a slant angle relative to a longitudinal direction, wherein the effect on the valve of fuel sloshing in the fuel tank is minimized;

an outlet pipe fixedly disposed on the housing for connection to the housing and for connection to a cannister;

a ball case for being liftably mounted in the housing and disposed with a sealing pad for blocking one side of the outlet pipe when lifted and formed to allow fuel and gas to Pass therethrough when descended; and resilient means disposed in the housing for allowing the sealing pad to maintain a detached state from one side of the outlet pipe and for blocking the outlet pipe during a roll over accident.

* * * * *